(12) United States Patent
Anderson

(10) Patent No.: US 6,570,894 B2
(45) Date of Patent: May 27, 2003

(54) REAL-TIME WAVELENGTH CALIBRATION FOR SWEPT LASERS

(75) Inventor: Duwayne R. Anderson, St. Helens, OR (US)

(73) Assignee: Tektronix, Inc., Beaverton, OR (US)

( * ) Notice: Subject to any disclaimer, the term of this patent is extended or adjusted under 35 U.S.C. 154(b) by 218 days.

(21) Appl. No.: 09/774,433

(22) Filed: Jan. 30, 2001

(65) Prior Publication Data

US 2002/0131045 A1 Sep. 19, 2002

(51) Int. Cl.[7] .................................................. H01S 3/13
(52) U.S. Cl. ................ 372/32; 372/29.02; 372/29.023; 372/6; 372/29.01
(58) Field of Search ........................... 372/32, 98, 105, 372/106, 29.02, 29.023, 6, 29.01, 87, 9; 356/478, 477, 436

(56) References Cited

U.S. PATENT DOCUMENTS

| | | | |
|---|---|---|---|
| 5,303,165 A | 4/1994 | Ganz et al. | |
| 5,596,440 A | 1/1997 | Patz et al. | |
| 5,696,707 A | 12/1997 | Hentschel et al. | |
| 5,724,373 A | 3/1998 | Chang | |
| 5,780,843 A | 7/1998 | Cliche et al. | |
| 5,798,859 A | 8/1998 | Colbourne et al. | |
| 5,825,530 A | 10/1998 | Leckel et al. | |
| 5,850,292 A | 12/1998 | Braun | |
| 5,896,193 A | 4/1999 | Colbourne et al. | |
| 5,982,791 A | 11/1999 | Sorin et al. | |
| 6,061,124 A | 5/2000 | Nyman et al. | |
| 6,067,150 A | 5/2000 | Beller et al. | |
| 6,091,744 A | 7/2000 | Sorin et al. | |
| 6,327,036 B1 | 12/2001 | Bao et al. | |
| 6,330,253 B1 * | 12/2001 | Tuganov et al. | 372/29.02 |
| 6,331,892 B1 | 12/2001 | Green | |
| 6,347,100 B1 * | 2/2002 | Sanders et al. | 372/6 |
| 6,434,173 B1 * | 8/2002 | Tuganov et al. | 372/9 |
| 6,449,047 B1 * | 9/2002 | Bao et al. | 356/478 |
| 2002/0131045 A1 * | 9/2002 | Anderson | 356/436 |
| 2002/0163646 A1 * | 11/2002 | Anderson | 356/477 |

OTHER PUBLICATIONS

Emmerich Muller, Clemens Ruck, Torsten Born, E.U. Wagemann and Edgar Leckel, "Fast and Accurate Determination of a Tunable Laser Wavelength and Its Application to DWDM Components", Mar. 7–10, 2000, OFC 2000 25th Anniversary Optical Fiber Communication Conference.

C. Gamache, M. Tetu, C. Latrasse, N. Cyr, M.A. Duguay and B. Villeneuve, "An Optical Frequency Scale in Exact Multiples of 100 Ghz for Standardization of Multifrequency Communications", IEEE Photonics Technology Letters, vol. 8, No. 2 Feb., 1996, pp. 290–292.

D.A. Humphreys, "Accurate Wavelength Calibration for Optical Spectrum Analysers", National Physical Laboratory, Teddington, Middlesex, TW11 OLW, U.K., pp. 97–100.

R. Boucher, B. Villeneuve, M. Breton and M. Tetu, "Calibrated Fabry–Perot Etalon as an Absolute Frequency Reference for OFDM Communications", IEEE Photonics Technology Letters, vol. 4 No. 7, Jul. 1992, pp. 800–804.

* cited by examiner

Primary Examiner—Leon Scott, Jr.
(74) Attorney, Agent, or Firm—Francis I. Gray

(57) ABSTRACT

A real-time wavelength calibration scheme for a swept laser generates an electrical signal from a swept optical output of the swept laser that is cyclical with respect to the wavelength of the swept optical output over a defined range of wavelengths. The point on the electrical signal at any given time provides an accurate phase for the swept optical output at that point. The electrical signal in turn is calibrated by generating calibration references from the swept optical output using known absorption lines within the defined range of interest. The wavelength of the swept laser is calibrated as a function of a reference wavelength from the known absorption lines and the phase at the given point.

19 Claims, 3 Drawing Sheets

REAL-TIME WAVELENGTH CALIBRATION FOR SWEPT LASERS

BACKGROUND OF THE INVENTION

The present invention relates to swept lasers, and more particularly to real-time wavelength calibration for swept lasers with picometer accuracy.

Photonic networks have seen a virtual explosion in complexity as more and more enabling components become commercially available. Many of these components are active, such as distributed feedback (DFB) lasers and erbium-doped fiber amplifiers (EDFAs). Other components are passive, such as multiplexers/demultiplexers and fiber Bragg gratings (FBGs). Often the characteristic of greatest interest in these passive components is their spectral transmission and/or reflectivity.

To measure the spectral characteristics of passive optical components, the industry has settled on two different techniques. One uses a broadband (spectrally bright) source to illuminate the component at the input and measures the spectral content of the light that is either transmitted or reflected by using an optical spectrum analyzer (OSA). The other technique uses a tunable laser as input to the passive component and a broadband detector, such as a power meter, on the output. As the laser's wavelength changes as measured by a wavelength meter, the power meter records differences in intensity and thus measures the wavelength-dependent transmission or reflectivity of the component.

Of these two techniques the tunable laser offers the best spectral resolution and dynamic range. Because of this it is becoming widely believed that the tunable laser method is the one most likely to succeed, though problems still remain. One of the most important problems is to achieve rapid, yet accurate, wavelength calibration. The most common configuration for this test bundles the tunable laser with a standard wavelength meter that is based on a Michelson interferometer. In this scenario the laser increments its wavelength and stops. The power meter reads the optical power and the wavelength meter measures the wavelength, and the process repeats.

The primary issue for this scenario is the time required to measure the wavelength with the wavelength meter. A typical Michelson interferometer needs many thousands of fringes to make an accurate wavelength measurement. Scanning this many fringes might take more than 50 milliseconds to acquire. Then the wavelength meter must take the fast Fourier transform (FFT) of the fringes and calculate the wavelength—a process that might take another 50 milliseconds, for example. In this illustration it takes about 0.1 second to measure the wavelength of the tunable laser.

If the spectral characteristics of a passive component are tested over a range of 2 nanometers (2,000 picometers) and the wavelength is indexed in 2 picometer steps, the laser is stepped 1000 times and each step requires 0.1 second to perform the wavelength calibration. The total test time is about 100 seconds or 1.67 minutes. Scanning with 1 picometer resolution doubles the time, and if the scan is extended over a range of 20 nanometers the time increases an additional ten-fold. A 100 nanometer range scan would require 2.78 hours! To test hundreds or thousands of such passive components results in the test station becoming a bottleneck that limits production rates. After calibrating the laser at the beginning of a use period, the laser is swept without the wavelength meter for a while before recalibrating. The results are not as accurate as calibrating before each sweep, but it is a compromise between the time required for calibration and the desired accuracy of the results.

Therefore what is needed is a way to quickly measure the wavelength of a swept laser while doing it with great accuracy.

BRIEF SUMMARY OF THE INVENTION

Accordingly the present invention provides a near real-time wavelength calibration for swept lasers by generating from the swept optical output an electrical signal that is cyclical with wavelength and by calibrating the electrical signal using known absorption lines within a defined range of wavelengths. One way to calibrate the swept lasers is to input the swept optical output into a polarizer that is coupled to one end and oriented at forty-five degrees to the eigen modes of a highly birefringent section of fiber. The other end of the highly birefringent fiber is coupled to a polarizing beam splitter which separates the orthogonally polarized modes. The outputs from the beam splitter are detected and the electrical outputs are composited to form the cyclical electrical signal. Another way to generate the cyclical electrical signal is to input the swept optical output into an unbalanced interferometer having a pair of unequal path lengths. The outputs from the two paths are input via a coupler to an optical receiver to obtain the cyclical electrical signal. For either way any point on the cyclical electrical signal corresponds accurately to the wavelength of the swept optical output at that point. In a parallel path a gas absorption cell containing a gas with known spectral absorption lines within the defined range of wavelengths receives the swept optical output and the spectral lines are detected by a detector to produce calibration references for the cyclical electrical signal at known wavelengths. Other points on the cyclical electrical signal are calibrated by interpolation between the known calibration references based on the phase difference between known spectral lines and the phase difference between the first known spectral line to the point desired.

The objects, advantages and other novel features of the present invention are apparent from the following detailed description when read in conjunction with the appended claims and attached drawing.

DETAILED DESCRIPTION OF THE INVENTION

Figure 1:
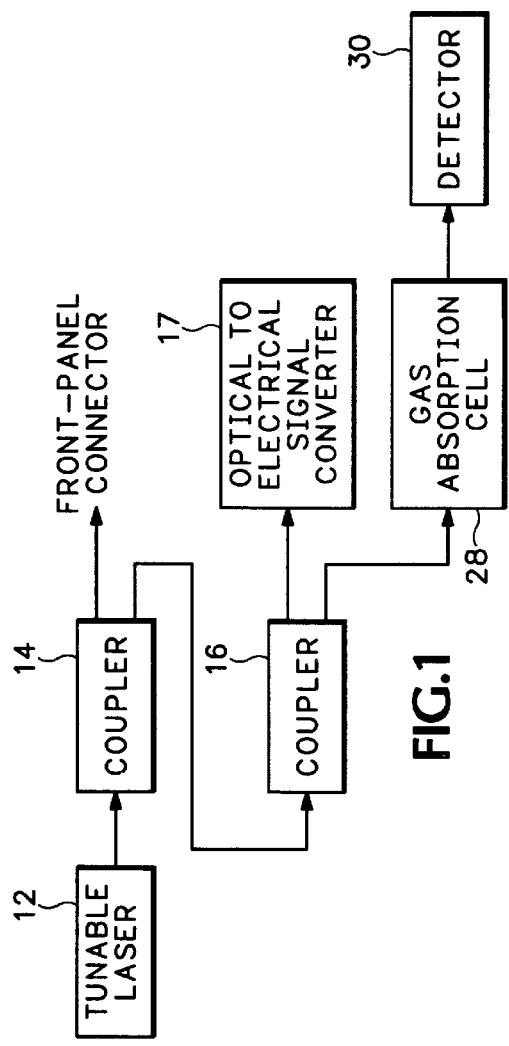
FIG. 1 is a block diagram view of a real-time wavelength calibration system for a swept laser according to the present invention.
Figure 2:
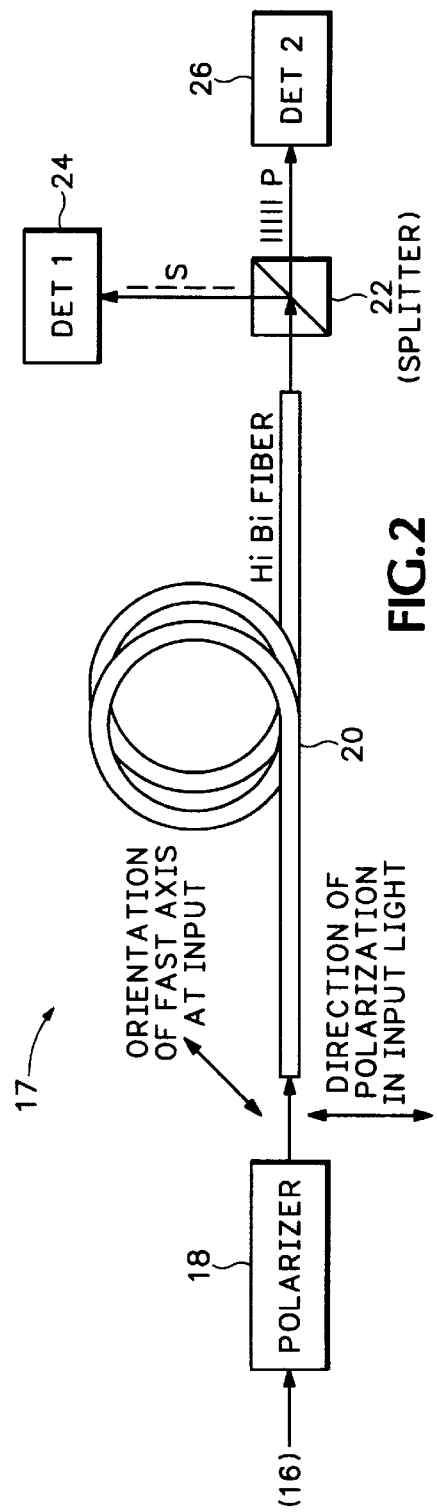
FIG. 2 is a block diagram view of a loop of polarization-maintaining fiber for generating an electric signal cyclical with swept laser wavelength according to the present invention.

Referring now to FIG. 1 a swept laser 12 provides a swept optical output to a first coupler 14 which provides the swept optical output to a front-panel connector and to a second coupler 16. The second coupler 16 provides the swept optical output to an optical to electrical signal converter 17 where the swept optical output is converted to an approximately sinusoidal cyclical electrical signal. One form of the optical to electrical signal converter 17 is shown in FIG. 2 where the swept optical output from the coupler 16 is input via a polarizer 18 to a section of highly birefringent (HiBi) fiber 20 that is designed to hold the state of polarization. The polarizer 18 is oriented so that it is 45° with respect to the eigen modes, or polarization axes, of the HiBi fiber 20. At the opposite end of the HiBi fiber 20 is a polarizing beam splitter 22 that also is oriented at 45° with respect to the polarization axes of the HiBi fiber. The HiBi fiber 20 in conjunction with the input polarizer 18 and the output polarizing beam splitter 22 with two detectors 24, 26 receiving the outputs from the splitter provides an electrical signal that varies cyclically with wavelength and has a period of about 80 picometers, depending upon the length of the HiBi fiber.

Figure 3:
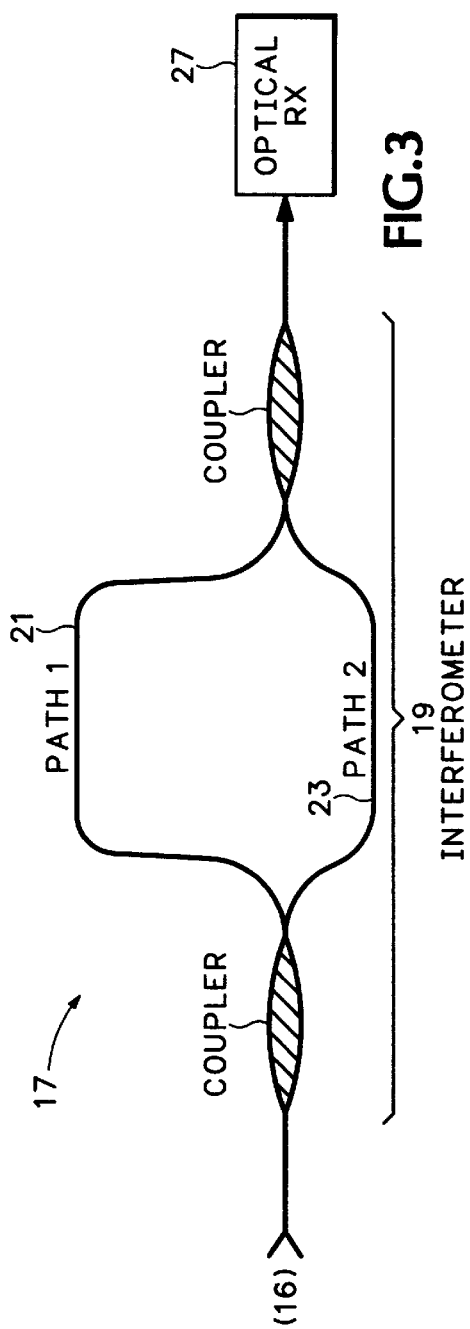
FIG. 3 is a block diagram view of an interferometer for generating the electric signal cyclical with swept laser wavelength according to the present invention.

Another way for implementing the optical to electrical signal converter 17 which is simpler, more stable and introduces less noise is to input the swept optical signal from the coupler 16 into an interferometer 19 as shown in FIG. 3. The interferometer 19 has a pair of paths 21, 23 of unequal lengths—unbalanced—such that the free spectral range (FSR) is approximately, for example, 80 picometers. The optical signal output from the interferometer 19 is input to an optical receiver 27. The output from the optical receiver 27 is an electrical signal that varies cyclically with wavelength with a period on the order of 80 picometers, depending upon the difference in the lengths of the paths 21, 23.

Returning now to FIG. 1 a gas absorption cell 28 also receives the swept optical output from the second coupler 16 and provides output to another detector 30 to provide calibration references for the cyclical electrical signal generated by the optical to electrical signal converter 17. Together these allow accurate, real-time picometer calibration of the wavelength of the tunable laser 12 output.

The approach to the calibration is two-fold:

(1) Generate from the swept optical signal an electrical signal that is cyclical with wave number, like having an encoder tied to the wavelength; and (2) Calibrate the cyclical electrical signal using known spectral absorption lines from the gas absorption cell 28.

To see how the polarizing optical components 18, 22 and the HiBi fiber 20 generate the cyclical electrical signal as the wavelength changes, consider the Jones matrix representation of the optical system, as shown in FIG. 2. The Jones matrix for the light that is input to the HiBi fiber 20 after passing through the polarizer 18 is $$\begin{vmatrix} E \\ 0 \end{vmatrix}.$$

The Jones matrix for the HiBi fiber 20 is $$\begin{vmatrix} \cos(\varphi'(\lambda)) + SQRT(-1)*\sin(\varphi'(\lambda))*\cos(2\theta)) & SQRT(-1)*\sin(\varphi'(\lambda))*\sin(2\theta)) \\ SQRT(-1)*\sin(\varphi'(\lambda))*\sin(2\theta)) & \cos(\varphi'(\lambda)) - SQRT(-1)*\sin(\varphi'(\lambda))*\cos(2\theta)) \end{vmatrix}$$

where $\lambda$ is the wavelength of the light, $\varphi'(\lambda)$ is half of the total phase delay between the fast and slow axes in the HiBi fiber 20, and $\theta$ is the angle between the input state of polarization and the fast axis of the HiBi fiber. The Jones matrix for the polarizing beam splitter 22 is $$\begin{vmatrix} 1 & 0 \\ 0 & 0 \end{vmatrix}$$

for one output and $$\begin{vmatrix} 0 & 0 \\ 0 & 1 \end{vmatrix}$$

for the other output. Combining the above equations the electrical field at the first leg of the polarizing beam splitter 22 is $$Eout1(\lambda) = \begin{vmatrix} 1 & 0 \\ 0 & 0 \end{vmatrix} \begin{vmatrix} \cos(\varphi'(\lambda)) + SQRT(-1)*\sin(\varphi'(\lambda))*\cos(2\theta)) & SQRT(-1)*\sin(\varphi'(\lambda))*\sin(2\theta)) \\ SQRT(-1)*\sin(\varphi'(\lambda))*\sin(2\theta)) & \cos(\varphi'(\lambda)) - SQRT(-1)*\sin(\varphi'(\lambda))*\cos(2\theta)) \end{vmatrix} \begin{vmatrix} E \\ 0 \end{vmatrix}$$

Expanding this equation, multiplying by it's complex conjugate, setting $\theta=45°$ and simplifying produces $$Pout1 = E^2 \cos((\varphi'(\lambda))^2$$

Similarly for the second output from the polarizing beam splitter 22

$$Eout2 = \begin{vmatrix} 0 & 0 \\ 0 & 1 \end{vmatrix} \begin{vmatrix} \cos(\varphi'(\lambda)) + SQRT(-1*\sin(\varphi'(\lambda))*\cos(2\theta)) & SQRT(-1*\sin(\varphi'(\lambda))*\sin(2\theta)) \\ SQRT(-1*\sin(\varphi'(\lambda))*\sin(2\theta)) & \cos(\varphi'(\lambda)) - SQRT(-1*\sin(\varphi'(\lambda))*\cos(2\theta)) \end{vmatrix} \begin{vmatrix} E \\ 0 \end{vmatrix}$$

and $$Pout2 = E^2 \sin(\varphi'(\lambda))^2$$

The sum of the two output equations equals one, illustrating the assumption here of lossless ideal optical components. Since the detectors 24, 26 are square-law detectors, the electrical current is proportional to optical power. A composite signal is formed by subtracting the detector currents and then dividing by their sum $$Sig = (Pout1 - Pout2)/Pout1 + Pout2)$$
$$= (E^2\cos(\varphi'(\lambda))^2 - E^2\sin(\varphi'(\lambda))^2)/(E^2\cos(\varphi'(\lambda))^2 + E^2\sin(\varphi'(\lambda))^2)$$
$$= 2\cos(\varphi'(\lambda))^2 - 1$$

This represents a desirable situation since the output signal is now normalized, having values that vary sinusoidally between +1 and −1. The phase delay between the fast and slow axes of the HiBi fiber 20 is $$\phi(\lambda) = 2\pi L \Delta n/\lambda$$

where L is the physical length of the fiber, $\Delta n$ is the difference between the index of the fast axis and the index of the slow axis and $\lambda$ is the wavelength of the light in vacuum. Remembering that $\phi'(\lambda)=0.5\ \phi(\lambda)$ and defining the wave number, k, as $k=2\pi/\lambda$, substituting in the equation for Sig produces $$Sig = 2\cos(Lk\Delta n/2)^2 - 1$$

Figure 4:
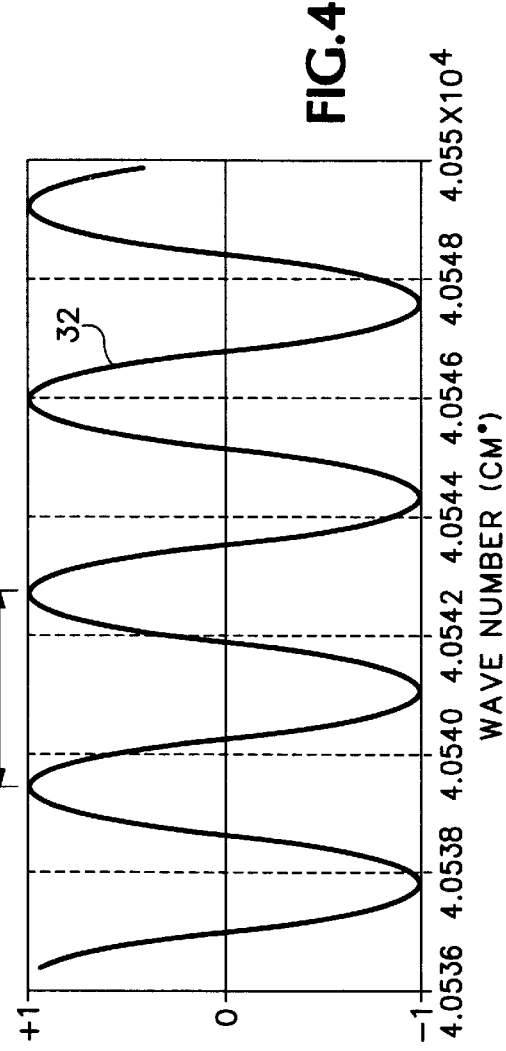
FIG. 4 is a graphic view of a sinusoidal output from the cyclical electrical signal generator according to the present invention.

When plotted as a function of wave number the composite output signal is sinusoidal with period $K=2\pi/L\Delta n$ FIG. 4 illustrates the composite signal 32 for a piece of HiBi fiber 20 that is 50 meters long and has a difference of 0.000388 between the index of the fast and the slow axes in the fiber. The FSR for this configuration is roughly 3.239 cm$^{-1}$, about 0.124 nanometers at 1550 nanometer wavelength. In scanning the laser over 100 nanometers there are approximately 800 cycles. A comparable signal is produced from the optical receiver 27 using the interferometer 19 shown in FIG. 3.

Likewise for the interferometer 19 of FIG. 3 the phase difference between the two paths 21, 23 is approximately ($\phi=2\pi\Delta Ln/\lambda$ where $\Delta L$ is the difference in length between the paths. The output from the interferometer 19 is $Sig=A_0^2 \cos^2(\pi\Delta Ln/\lambda)$, where $A_0^2$ is the signal input to the interferometer. Therefore the output of the interferometer 19 as a function of wave number ($1/\lambda$) is a simple sin-squared function.

Knowing the precise length of the fiber 20 as well as the difference in index between the eigen modes, or knowing the difference in lengths in the two paths 21, 23 of the interferometer 19, only a single point on the waveform needs to be calibrated, after which any other wavelength may be calibrated by counting cycles. However the length of the fiber 20 or paths 21, 23 changes with environmental conditions—temperature primarily—and $\Delta n$ changes with both environmental conditions as well as wavelength. These changes may not be large under other conditions, but when calibrating to nanometer precision these effects cannot be ignored.

Figure 5:
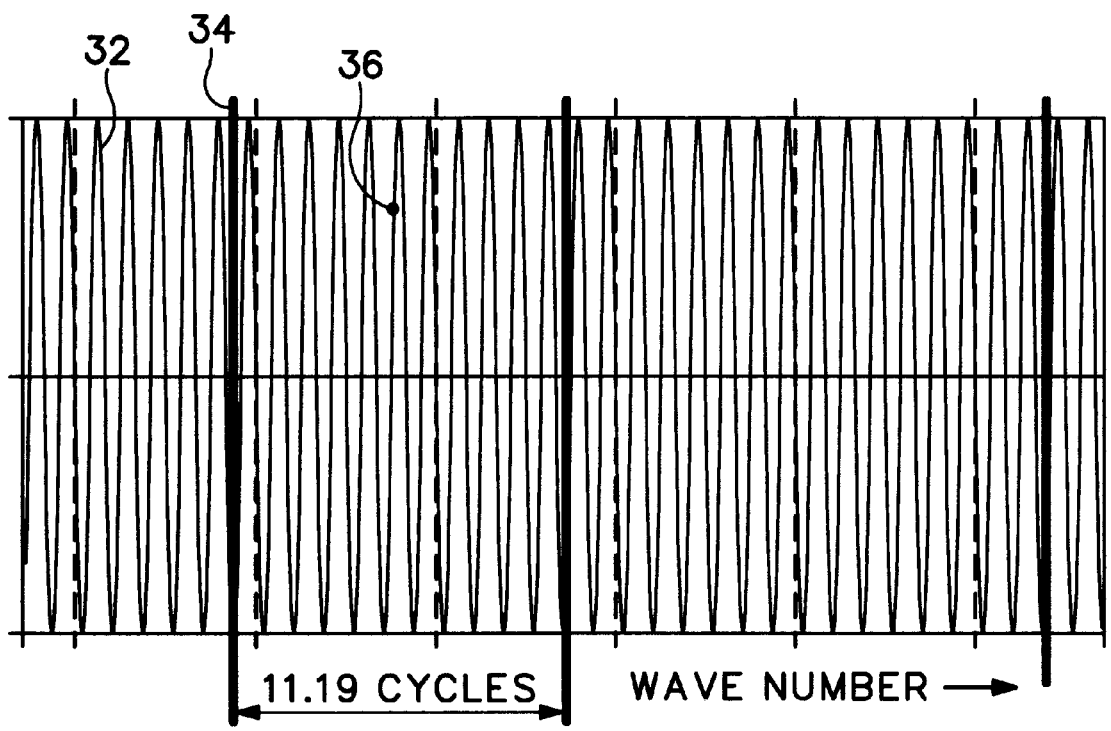
FIG. 5 is a graph view of the sinusoidal output superimposed with known absorption spectral lines according to the present invention.

This is where the second leg of the second coupler 16 comes in. The second leg has the gas absorption cell 28 containing, for example, acetylene or hydrogen cyanide. These gases have many absorption lines near optical wavelengths of 1550 nanometers, and are ideal for calibration of sources used in telecommunications. FIG. 5 illustrates how the absorption spectra 34 may be used to calibrate the cyclical waveform 32 of FIG. 4. In this example the wavelength of a sample 36 indicated by the star is determined.

When the swept laser 12 scans, there is some sort of indicator that correlates the laser's position. This indicator may be steps from a stepper motor used to rotate a grating in the swept laser 12, or some other similar signal. The horizontal axis in FIG. 5 represents this signal from inside the swept laser 12. As this signal changes, the laser's wavelength changes in an unknown way, though hopefully designed to be as linear as possible. These changes in wavelength result in the approximately sinusoidally varying cyclical waveform 32 from the optical to electrical signal converter 17 as well as changes in optical power due to absorption in the gas absorption cell 28. The absorption lines 34 are at known wavelengths and, since they are associated with the cyclical waveform 32 through the coordinates along the horizontal axis, they may be used to calibrate the cyclical waveform.

Suppose that $k1_{known}$ and $k2_{known}$ represent two known wave numbers as determined from the locations of the absorption spectra 34. Suppose that $\Delta\phi_1$ is the phase between these two known wave numbers as determined by the cyclical waveform 32. In the example of FIG. 5 the left-most absorption line 34 has a wavelength of 1531.588 nanometers and the next absorption line to the right has a wavelength of 1530.976 nanometers, corresponding to the P(11) and P(10) lines in acetylene. By examining the cyclical waveform there are 11.19 cycles separating the two calibration wavelengths. Defining $\Delta\phi_2$ as the phase difference between the first known wave number from the absorption line spectra 34 and the unknown wave number that is desired, the wave number $k_{unknown}$ at the location of the sample 36 is determined.

$$k_{unknown} = k1_{known} + \Delta\phi_2((k2_{known} - k1_{known})/\Delta\phi_1)$$

For $k1_{known}$=41023.991 cm$^{-1}$, $k2_{known}$=41040.391 cm$^{-1}$, $\Delta\phi_1$=11.19*$2\pi$ and $\Delta\phi_2$=5.14*$2\pi$ reading from the phase differences in FIG. 5, then the unknown wave number of the sample 36 is 41031.524 cm$^{-1}$, which is 1531.307 nanometers. Using this algorithm the wave number, and thus the wavelength, of every point in the cyclical waveform 32 may be calibrated, which means that the wavelength at every step in the sweep of the tunable laser 12 may be calibrated.

To estimate the calibration error the difference between the known wave numbers is known with great accuracy, typically less than one picometer error, which means that the error resulting from calculating the unknown wave number depends upon the separation between the absorption lines 34 used for the calibration and the uncertainty with which phases may be measured. Techniques exist for measuring phases with great accuracy, and the separation between absorption lines 34 in acetylene and hydrogen cyanide cells is on the order of 0.5 nanometers. Thus the algorithm presented holds the potential for absolute calibration errors on the order of one picometer. The algorithm is most accurate when interpolating between absorption lines 34, but also is reasonably accurate in extrapolation as well so long as the cyclic characteristics of the electrical signal do not change much with the extrapolated wave number or during the time required to perform the sweep.

Optimum accuracy depends on having the swept laser 12 sweep as fast as possible while maintaining adequate signal-to-noise ratios (SNRs) in the detectors 24, 26, 30 and receiver circuitry. The optical loss between the swept laser 12 and these detectors 24, 26, 30 should be relatively low, on the order of 10 dB or less. This means that, if the laser's output is 1 dBm, then there should be −10 dBm at the detectors. To scan 10 nanometers in 0.1 second while sampling every picometer requires collecting roughly 10,000 samples in 0.1 second or 100 k samples per second. Therefore the bandwidth of the receiver circuitry should be on the order of 100 kHz. A well-designed receiver/detector front end may have −80 dBm noise-equivalent power with several hundred kHz bandwidth, so SNR should be about 70 dB. This is more than adequate for very precise phase measurements while keeping even the broadest spectral scans under one second, assuming the laser 12 can tune that fast.

Once the waveforms are acquired, they are calibrated. But this is a one-time process and is a relatively simple and straightforward algorithm as described above. A few seconds is probably adequate for the calculation given a reasonably capable digital signal processor (DSP). Thus the total time for a 30 nanometer scan with one picometer resolution and picometer accuracy may be accomplished in less than four or five seconds, which is a dramatic improvement in time over tunable lasers that are calibrated with a Michelson interferometer.

Thus the present invention provides a real-time wavelength calibrator for swept lasers by forming an electrical waveform that varies cyclically with wavelength for the swept laser and calibrating the cyclical electrical waveform with known absorption spectral lines so that a point on the cyclical waveform may be accurately determined as to its wavelength by interpolating between or extrapolating from the known absorption spectral lines.

What is claimed is:

1. A real-time wavelength calibration system for a swept laser comprising:

means for generating from a swept optical output of the swept laser an electrical signal that is cyclical with optical wavelength for the swept laser over a defined optical wavelength range such that the wavelength corresponding to each point of the electrical signal is accurately known; and means for providing from the swept optical output a calibration reference for the electrical signal using known spectral absorption lines.

2. The system as recited in claim 1 wherein the generating means comprises:

an unbalanced interferometer with two optical paths of unequal length having the swept optical output from the swept laser as an input; and means for converting an optical output from the unbalanced interferometer into the cyclical electrical signal.

3. The system as recited in claim 1 wherein the generating means comprises:

a polarizer having as an input the swept optical output from the swept laser;

a highly birefringent section of fiber coupled at one end to an output of the polarizer such that the polarizer is oriented at forty-five degrees with respect to the eigen modes of the fiber;

a polarizing beam splitter coupled to the other end of the highly birefringent section of fiber oriented at forty-five degrees with respect to the eigen modes of the fiber; and a pair of detectors, one coupled to each output of the polarizing beam splitter, to generate respective output electrical signals, the composite of which is the electrical signal.

4. The system as recited in claims 1, 2 or 3 wherein the providing means comprises:

a gas absorption cell containing a gas having known spectral absorption lines within the defined optical wavelength range, the gas absorption cell having an input coupled to receive the swept optical output from the swept laser; and a detector for converting the known spectral absorption lines from the gas absorption cell into the calibration reference.

5. The system as recited in claim 4 wherein the gas in the gas absorption cell comprises a material selected from the group consisting of acetylene and hydrogen cyanide for the swept laser having a nominal wavelength of 1550 nanometers.

6. The system as recited in claim 4 wherein the composite of the respective output electrical signals comprises the difference of the respective output electrical signals as the electrical signal.

7. The system as recited in claim 4 further comprising means for calibrating the electrical signal with respect to wavelength using the known spectral absorption lines.

8. The system as recited in claim 7 wherein the calibrating means comprises means for interpolating between the known spectral absorption lines the calibration of the electrical signal.

9. The system as recited in claim 8 wherein the calibrating means further comprises means for extrapolating from the known spectral lines the calibration of the electrical signal.

10. A method of real-time wavelength calibration for a swept laser comprising the steps of:

generating from a swept optical output of the swept laser an electrical signal that is cyclical with optical wavelength for the swept laser over a defined optical wavelength range such that the wavelength corresponding to each point of the electrical signal is accurately known; and providing from the swept optical signal a calibration reference for the electrical signal using known spectral absorption lines.

11. The method as recited in claim 10 wherein the generating step comprises the steps of:

transmitting the swept optical signal through two parallel optical paths of unequal length in an unbalanced interferometer; and converting the output of the unbalanced interferometer into the cyclical electrical signal.

12. The method as recited in claim 10 wherein the generating step comprises the steps of:

inputting the swept optical output to a polarizer;

coupling a highly birefringent section of fiber at one end to an output of the polarizer, the polarizer being oriented at forty-five degrees with respect to the eigen modes of the fiber;

coupling a polarizing beam splitter to the other end of the highly birefringent section of fiber, the polarizing beam splitter being oriented at forty-five degrees to the eigen modes of the fiber and having a pair of output;

deriving from the pair of outputs of the polarizing beam splitter the electrical signal as a composite of the pair of outputs.

13. The method as recited in claims 10, 11 or 12 wherein the providing step provides the steps of:

inputting the swept optical output to a gas absorption cell containing a material having known absorption spectral lines within the defined optical wavelength range; and detecting from an output of the gas absorption cell the known absorption spectral lines as the calibration reference.

14. The method as recited in claim 13 wherein the material comprises a gas selected from the group consisting of acetylene and hydrogen cyanide for the tunable laser having a nominal wavelength at 1550 nanometers.

15. The method as recited in claim 13 wherein the deriving step comprises the step of differencing the pair of outputs from the polarizing beam splitter to form the composite as the electrical signal.

16. The method as recited in claim 13 further comprising the step of calibrating the electrical signal with respect to wavelength using the calibration reference.

17. The method as recited in claim 16 wherein the calibrating step comprises the step of interpolating between known spectral absorption lines of the calibration reference the calibration of the electrical signal.

18. The method as recited in claim 17 wherein the calibrating step further comprises extrapolating from the known spectral absorption lines of the calibration reference the calibration of the electrical signal.

19. A wavelength calibration system comprising:

means for generating an electrical signal that is cyclical with optical wavelength over a defined optical wavelength range such that a relative wavelength corresponding to each point of the electrical signal is accurately known; and means for combining the electrical signal with a calibration reference using known spectral absorption lines to provide calibration of the relative wavelengths over the defined optical wavelength range.

* * * * *